March 1, 1966 J. R. ZIMMERMAN 3,238,446
NUCLEAR MAGNETIC RESONANCE TECHNIQUE
FOR MEASUREMENT OF MIXTURES
Filed Dec. 12, 1961 3 Sheets-Sheet 1
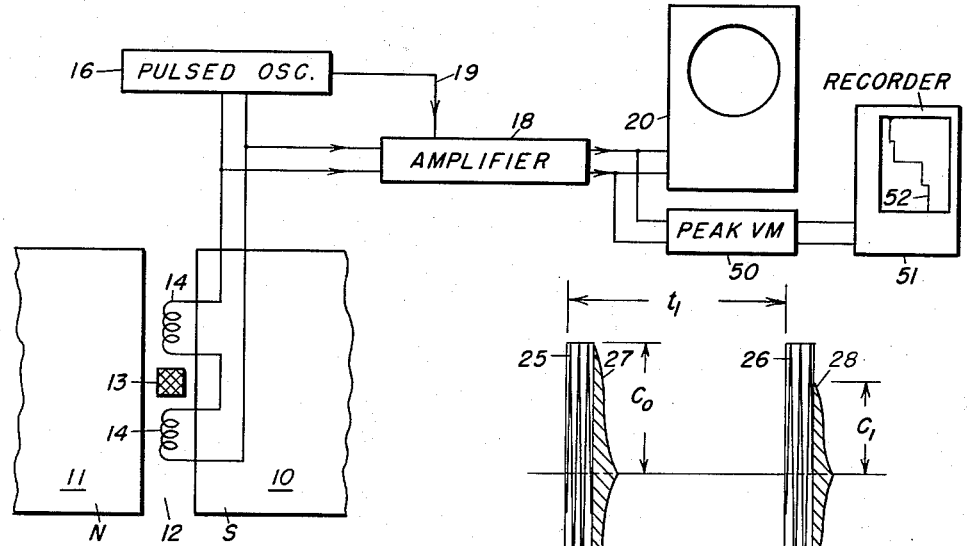
FIG. 1.
FIG. 2.
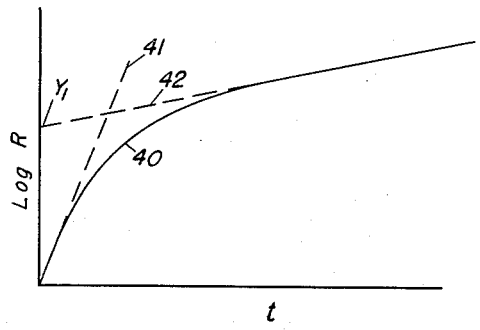
FIG. 4.
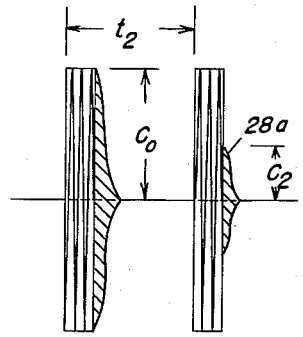
FIG. 3.
JOHN R. ZIMMERMAN
INVENTOR.
BY D. Carl Richards
ATTORNEY March 1, 1966

J. R. ZIMMERMAN 3,238,446

NUCLEAR MAGNETIC RESONANCE TECHNIQUE
FOR MEASUREMENT OF MIXTURES

Filed Dec. 12, 1961

JOHN R. ZIMMERMAN
INVENTOR.

BY D. *Cave Richards*

ATTORNEY

March 1, 1966  J. R. ZIMMERMAN  3,238,446
NUCLEAR MAGNETIC RESONANCE TECHNIQUE
FOR MEASUREMENT OF MIXTURES
Filed Dec. 12, 1961  3 Sheets-Sheet 3

JOHN R. ZIMMERMAN
INVENTOR.

BY D. Care Richards
ATTORNEY

United States Patent Office
3,238,446
Patented Mar. 1, 1966

3,238,446
NUCLEAR MAGNETIC RESONANCE TECHNIQUE
FOR MEASUREMENT OF MIXTURES
John R. Zimmerman, P.O. Box 900, Dallas 21, Tex.
Filed Dec. 12, 1961, Ser. No. 162,627
16 Claims. (Cl. 324—.5)

This application is a continuation-in-part of prior application Serial No. 423,188, filed April 14, 1954, which has now been abandoned.

This invention relates to the determination of the relative proportions of certain constituents in mixtures and more particularly to the production and detection of nuclear magnetic resonance signals within the mixture which are indicative of atoms in different environments.

Nuclei, for example protons, become polarized in a unidirectional magnetic field. If subsequently subjected to a second field, such as an alternating field, having a vector orientation at right angles to the polarizing field, they exhibit a measurable transient phenomena. The transient detected in the form of an alternating current and signal may indicate the character of the substance associated with or made up of the protons.

This phenomenon, known as "nuclear magnetic resonance," is dependent upon the charge, the mass and the motion of a proton and its reaction with a magnetic field. It has been found that for a given system of identical nuclei there is a certain frequency, the "Larmor frequency," at which an ensemble of nuclei will resonate in a magnetic field of given strength. It has further been found that measurable time intervals associated with the transient phenomena, longitudinal relaxation time $T_1$ and transverse relaxation time $T_2$, provide a further basis for characterizing a given system.

The processes involved are complex and have not heretofore been sufficiently understood to provide an index to the relative proportions of, for example, two different compounds containing protons in different chemical or structural relationships when present in a common carrier or in a mixture.

It has been found that if a mixture is placed in a polarizing unidirectional magnetic field and the protons in the mixture are repeatedly excited by certain secondary magnetic fields, there may then be measured alternating current signals resulting from motion of the protons due to both of the fields at a plurality of points which are indicative of the proportions of protons in different environments in the mixture.

In accordance with the present invention, it has been found that measurements dependent primarily upon the longitudinal relaxation time $T_1$ or transverse relaxation time $T_2$ may be utilized to identify the character of a given system of nuclei and further to differentiate between nuclei of the same species existing in two different environments in the same quantity of material subject to tests. More particularly, the present invention comprises the method of characterizing the proportions of constituents in a system of at least two components by exciting the protons in said system with repeated applications of pulsed electromagnetic fields while the system is in a polarizing magnetic field and measuring the magnitude of resultant signals following removal of certain of the fields for a plurality of different decay time intervals during which the magnetization approaches the equilibrium magnetization condition effective at the site of the protons during the decay time interval.

The present invention further relates to a system suitable for carrying out the foregoing method.

For further objects and advantages of the present invention, reference may now be had to the following description taken in conjunction with the accompanying drawings in which:

FIGURE 1 diagrammatically illustrates a system for carrying out the present method;

FIGURES 2 and 3 are time plots of voltage functions for measurements based upon longitudinal relaxation time $T_1$;

FIGURE 4 is a plot of a function of the voltages in FIGURES 2 and 3;

Figure 8:
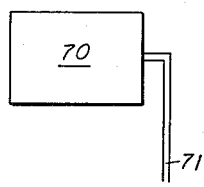
FIGURE 8 is a view partially in section of a well logging system.

Before turning to a detailed description of the drawings, it should be noted that in a mixture of two constituents A and B, measurements of relative amounts of the constituents may be made in dependence upon the longitudinal relaxation time $T_{1A}$ and $T_{1B}$. Such measurements may also be dependent upon the transverse relaxation times $T_{2A}$ and $T_{2B}$. Either measurement generally will permit determination of the proportions of the constituents and in some cases the identity of the constituents) if $T_{1A}$ differs from $T_{1B}$ and if $T_{2A}$ differs from $T_{2B}$.

FIGURES 1–3 relate to measurements dependent upon longitudinal relaxation time $T_1$.

Referring now to FIGURE 1, a permanent magnet system or a suitably controlled electromagnet having pole pieces 10 and 11 provides a unidirectional magnetic field in an air gap 12 to polarize any protons in such field. Means (not shown) are provided for supporting a sample of material to be studied such as a sample 13 in air gap 12. Two coils 14 are positioned on opposite sides of sample 13 in air gap 12 and oriented with their axes normal to the lines of magnetic flux in the air gap.

Coils 14 are excited from an alternating current source 16. In high polarizing field applications of the invention, source 16 preferably is an oscillator adapted to provide pulsed radio-frequency power at selectable power levels. Also connected in circuit with the coils 14 is a sensing and indicating system generically represented by the amplifier 18 and oscilloscope device 20 which in general will include a control means (not shown). Voltages appearing across the terminals of coils 14 may thus be viewed or otherwise measured on the oscilloscope 20.

The foregoing diagrammatically represents a suitable analyzing system. It will be understood that suitable control means such as are well known to the art may be employed between coils 14, source 16 and amplifier 18 to prevent overdriving by signals from source 16 thereby to permit subsequent detection of relatively low amplitude signals induced in coils 14. Such control action may be impressed on the input stage of amplifier 18 as by channel 19 to render amplifier 18 insensitive to pulse energy from source 16 and then to render it sensitive to resultant signals from coils 14.

Protons in sample 13 when placed in the magnetic field in the air gap 12 are polarized seeking an orientation such that the macroscopic vector representative of the electromagnetic properties of the protons is parallel with the unidirectional magnetic field in air gap 12. The unidirectional magnetic field nuclearly polarizes atoms in the sphere of its influence such that the magnetic moment of the atoms seeks alignment with the lines of force of the magnetic field. The oscillator 16 preferably is controlled in such a manner that a pulse 25, FIGURE 2, of radio-frequency energy is first applied to coils 14 and upon lapse of a time interval $t_1$ a like pulse 26 is applied. Application of pulses 25 and 26 causes disorientation of the protons in the magnetic field, i.e. the proton macroscopic moment vector is displaced 90° and caused to lie in a plane common to the axis of coils 14. Following removal of pulses 25 and 26, the macroscopic moment vector begins to precess about an axis parallel to the unidirectional magnetic field but the component thereof normal to the unidirectional magnetic field rapidly decays to zero because of phase dispersion.

Due to the precession above noted, there is induced in coils 14 a radio-frequency transient hereinafter referred to as a free decay electromagnetic signal which, in general, has an initial high amplitude and decays to zero. This transient field is represented in FIGURE 2 by the envelopes 27 and 28. Following the first pulse 25, the initial amplitude of the decay signal 27, amplitude $C_0$, is relatively large. If the time interval $t_1$ is long enough for all protons in air gap 12 to reach equilibrium, the initial amplitude of pulse 28 will be the same as the amplitude of pulse 27.

However, as shown in FIGURE 2, if $t_1$ is insufficient for all protons to reach equilibrium, pulse 28 will have a reduced amplitude $C_1$. Referring now to FIGURE 3, it will be seen that for a still shorter time interval $t_2$ the initial amplitude of the pulse 28a is much less, having an amplitude $C_2$. As the time interval $t$ approaches zero, the amplitude of the pulse following the second pulse in each pair of pulses will approach zero.

In accordance with this aspect of the invention, electromagnetic radio-frequency signals such as the induced signals 27, 28 and 28a are measured at a plurality of points in the time domain ($t$). Stated otherwise, measurements are made for a plurality of very short values of ($t$) such as would be sufficient to produce an accurate plot of the function shown in FIGURE 4. The function shown in FIGURE 4 may best be understood by considering the following analysis of the physical reactions producing reflections or pulses such as 27, 28 and 28a.

If the sample 13 contains protons of a single characteristic only, for example if sample 13 is a homogeneous liquid (a single component), it can be shown that where the power level of the radio-frequency field is selected to rotate the macroscopic moment vector of the hydrogen atoms to a position perpendicular to the polarizing field the initial amplitude C of a pulse signal, such as pulse 28 or pulse 28a, may be expressed as follows:

$$C = C_0(1 - e^{-t/T_1}) \quad (1)$$

where $C_0$ is the initial amplitude of the decay signal 27;

$T_1$ is the classical longitudinal relaxation time for the particular sample; and $t$ is the time interval between the pulses 25 and 26.

On the other hand if sample 13 includes a mixture of two different liquids A and B, the liquids being such that their longitudinal relaxation times $T_{1A}$ and $T_{1B}$ are different, then it can be shown that:

$$C = \sum_i C_{0i}(1 - e^{-t/T_{1i}}) \quad (2)$$

where $C_{0i}$ is the amplitude of a pulse corresponding to pulse 27 for a mixture of components A and B;

$t$ is the spacing between pulses applied to coil 14; and $T_{1i}$ is the longitudinal relaxation time for the $i$th component of the mixture, i.e. component A or component B.

From a measurement of the amplitudes of pulses 27, 28, 28a, etc., there may be determined the value of a function R where:

$$R = \frac{C_0}{C_0 - C} \quad (3)$$

It shown now be understood that:

$$C_0 = \sum_i C_{0i} = C_{0A} + C_{0B} \quad (4)$$

where $C_{0A}$ is the contribution to the measured pulse of component A; and $C_{0B}$ is the contribution to the measured pulse of component B.

Combining Equations (2) and (3) it will be seen that:

$$R = \frac{C_0}{\sum_i C_{0i} e^{-t/T_{1i}}} \quad (5)$$

From a consideration of FIGURE 4 it will be seen that for a two-component mixture comprised of components A and B data is obtained and available for the identification of two separate components contributing to a composite curve. In graphical form the data results in a plot of log R (as determined from Equation [5]) as a function of pulse interval ($t$). A curve 40 is thus determined. From Equation (5) it will be seen that as $t$ approaches zero, R approaches unity. Immediately adjacent $t=0$, the curve 40 has an apparent initial slope or growth rate as indicated by the dotted line 41. For large values of $t$, the curve approaches a second slope distinctively different from that of line 41 as indicated by the dotted line 42. For the purpose of the following consideration, the zero intercept of the line 42 will be indicated as $Y_1$. The existence of two such distinctive slopes from the curve 40 is due to the presence of two components in the system. If but a single component is present, the plot of R will be a straight line. The portion of the curve having slope corresponding to dotted line 41 is controlled by the combination of the two constitutents. The portion of the curve having the slope corresponding to that of line 42, however, is due substantially entirely to one of the two constituents. From such consideration the relative proportions of constituents A and B may then be determined merely by determining the numerical values of the slopes corresponding to lines 41 and 42 and the intercept $Y_1$.

More particularly, the contribution to pulse amplitude of component A (which is proportional to its concentration) may be expressed as follows:

$$C_{0A} = \frac{C_0}{Y_1} \quad (6)$$

Similarly, the concentration of component B is proportional to $C_{0B}$ which may be determined by solving the equation:

$$C_{0B} = \frac{Y_1 - 1}{Y_1} C_0 \quad (7)$$

From the foregoing it will be apparent that a plot of log R (Equation [3]) will yield sufficient information to permit determination of the relative proportions of two constituents in the mixture.

The graphical method of analysis of the data above described is readily available to anyone desiring to evaluate a mixture from nuclear resonance data obtained in time domains sufficiently spread to properly assign slopes to the different portions of the curve. However, it will be recognized that data involved in four different measurements as above described can be utilized in computational techniques to obtain a solution to Equation (5). Thus the invention may be employed without carrying out the graphical technique illustrated in FIGURE 4 if the four measurements above-outlined are obtained and physical representations thereof utilized for computational procedures. The latter will be explained in further detail. However, the graphical technique involving curve 40 may provide not only an indication as to the relative amounts of the constituent but also in indication as to the identity of the constituents. More particularly, the longitudinal relaxation time of constituent A bears the following relationship to the curve of FIGURE 4:

$$T_{1A} = \left(\frac{d}{dt} \log_e R\right)_\infty^{-1} \quad (8)$$

Where the notation denotes that the bracketed expression is to be evaluated in the limit as $(t)$ approaches infinity.

Similarly, the longitudinal relaxation time of constituent B may be expressed as follows:

$$T_{1B} = \left[\frac{Y_1}{Y_1-1}\left(\frac{d}{dt}\log_e R\right)_0 - \frac{1}{Y_1-1}\left(\frac{d}{dt}\log_e R\right)_\infty\right]^{-1} \quad (9)$$

Where the bracketed portion having the subscript zero (0) indicates that the slope of the curve is to be evaluated at $t$ equals zero.

It has been found that protons in water contained in a sample of earth material, as for example a section of a core from a well, have a distinctive time $T_1$ which is different from the time $T_1$ for crude oils in the same sample. From a determination of the slope of curve 40 at $t=0$ and as $t$, in the limit, approaches infinity, the relative proportion of oil and of water in the core may be determined.

It is important to understand at this point that the proportions of constituents in such a mixture may be determined by making at a minimum four measurements, i.e. measurements at four different values of $t$, two of which are immediately adjacent $(t)$ equals zero and two taken at points where $t$ is very large. For example, as illustrated in FIGURE 1, a gated peak reading vacuum tube voltmeter 50 may be connected to the output of amplifier 18 to apply to a recorder 51 signals representative of the initial amplitude of the free decay pulse such as pulses 27, 28, 28a, etc. for four different values of $(t)$. For a two component mixture the four amplitude values, as indicated by the recorder chart line 52, may be utilized to determine the proportions of the two constituents of a mixture. Gated peak reading voltmeters such as meter 50, while not shown in detail, are well understood by those skilled in the art and may comprise, for example, a system such as generically illustrated in Patent No. 2,568,689 to Gerald C. Summers, a coworker of applicant. Such a voltmeter may be gated or turned on coincidently with the termination of pulse 25 or 26 so that the maximum amplitude of the decay pulse will be measured. Alternatively the values from the peak reading voltmeter 50 may be applied to a computer. Each of the four values stored in such computer or applied thereto as input data would be employed in a suitable program to carry out the computation indicated in Equation (5) and for evaluating the longitudinal relaxation times $T_{1A}$ and $T_{1B}$ as indicated in Equations (8) and (9).

It should now be appreciated that the foregoing description has related to measurements dependent upon the longitudinal relaxation time $T_1$. There will now be explained the manner in which measurements may be made upon transverse relaxation time $T_2$ with the same beneficial results as above described. It should be kept in mind that the longitudinal relaxation times ($T_{1A}$ and $T_{1B}$) for two components (A and B) of a mixture may be identical, whereas their transverse relaxation times ($T_{1A}$ and $T_{2B}$) may differ. In this case the procedure now to be explained may be followed to determine the relative proportions in the mixture.

Figure 5:
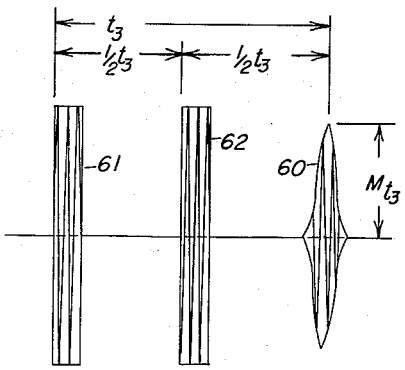
FIGURES 5 and 6 are time plots of voltage functions for measurements based upon transverse relaxation time $T_2$.
Figure 6:
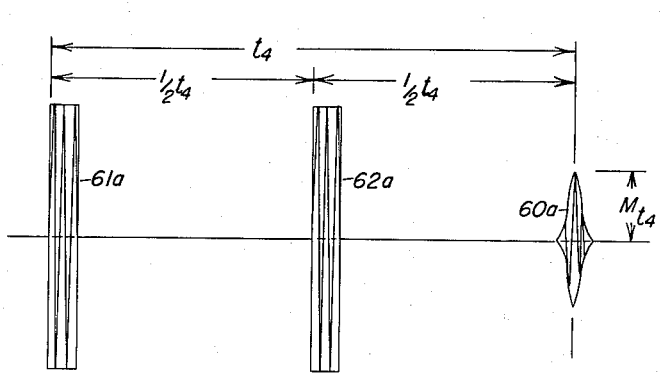

Referring to FIGURE 5, measurements are based upon the maximum amplitude of a pulse echo such as generically represented by the wave envelope 60 occurring in time following the second of two pulses 61 and 62 applied to the coils 14 of FIGURE 1. More particularly, pulses 61 and 62 are spaced apart a time interval ($\frac{1}{2} t_3$). The maximum amplitude $M_{t3}$ of the pulse echo 60 will occur at a time interval ($\frac{1}{2} t_3$) following the second pulse 62. If time interval ($t_3$) is made very short, the amplitude of pulse 60 is relatively large. In contrast, and as shown in FIGURE 6, if the time interval is made very long such as ($t_4$) relative to pulses 61a and 62a, then the echo pulse 60a will be much smaller, approaching zero as $(t)$ approaches infinity.

Figure 7:
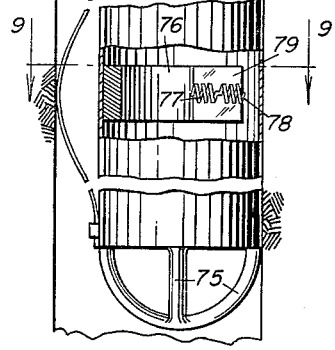
FIGURE 7 is a plot of a function of the voltages in FIGURES 5 and 6.
Figure 7:
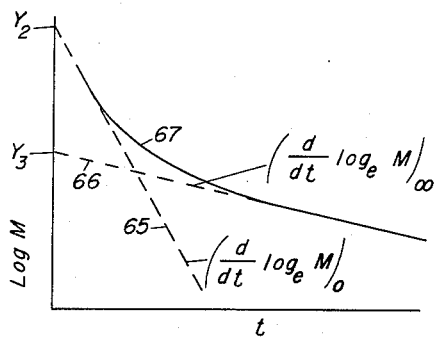

If the sample 13 under test comprises a single constituent, the slope of the log function of the amplitude of the pulse echo as a function of $(t)$ is a straight line. For example as shown in FIGURE 7, dotted line 65 or dotted line 66 might represent variations in the log of the amplitude of a pulse echo for a single component. However, if two components are present, then a curve such as line 67 will be obtained since the amplitude (M) of any pulse echo is dependent upon the contribution of the two constituents. Stated mathematically:

$$M = \sum M_{0i} e^{-t/T_{2i}} \quad (10)$$

where $M_{0i}$ is the contribution to the amplitude of the pulse echo for an $i$th component where the interval $t$ between pulses approaches zero;

$t$ is twice the spacing between pulses 61, 62, etc.; and $T_{2i}$ is the transverse relaxation time for the $i$th component of the mixture, i.e. of component A or component B.

It has been found that:

$$M_{0A} = Y_3 \quad (11)$$

where $M_{0A}$ is the contribution of component A to the pulse amplitude; and $Y_3$ is the zero intercept of the extrapolation of curve 67 in the time domain where $t$ approaches infinity.

Similarly:

$$M_{0B} = (Y_2) - (Y_3) \quad (12)$$

where $M_{0B}$ is the contribution to the pulse amplitude of the component B; and $(Y_2)$ is the zero intercept of the dotted line 66, i.e., of the slope of curve 67 in the time domain where $(t)$ approaches zero.

Further utilization of the intercepts $Y_2$ and $Y_3$ and the slope of curve 67 in the domain where the curve approaches zero and in the domain where the curve approaches infinity may provide a means for identifying the atoms which comprise the mixture.

$$T_{2A} = \left[-\frac{d}{dt}\log_e (M)\right]^{-1} \quad (13)$$

$$T_{2B} = \left[-\frac{Y_2}{Y_2-Y_3}\left(\frac{d}{dt}\log_e (M)\right)_0 + \frac{Y_3}{Y_3-Y_2}\left(\frac{d}{dt}\log_e (M)\right)_\infty\right]^{-1} \quad (14)$$

where $d/dt$, $\log_e(M)$ is taken at the points indicated in FIGURE 7.

While the foregoing description has related to measurements in liquids suitably segregated as in an appropriate sample holder or cell, it should be understood that the method relates generally to the detection of nuclei in different environments, that is in environments which differently affect the relaxation phenomena thereof. In accordance with the present invention, the ratio of oil to water produced by an oil well may be made at or adjacent to the site of the producing horizons within the well bore proper to provide pertinent information as to the productive qualities of a given stratum. More particularly, the magnet comprising pole pieces 10 and 11 along with coils 14 may be housed in a well exploring tool in such a manner as to permit liquids flowing through the well bore to pass through the air gap in the vicinity of the coils 14 thereby to excite the nuclei in the well fluids.

Figure 9:
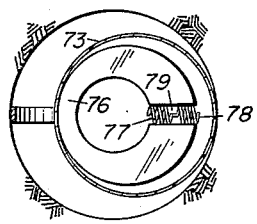
FIGURE 9 is a sectional view of FIGURE 8 taken along the lines 9—9 of FIGURE 8.

More particularly, as shown in FIGURE 8, a surface unit 70 may include a pulse source and measuring system (for example, elements 16, 18, 20, 50 and 51 of FIGURE 1), which is connected as by channel 71 to a bore hole unit 72. Unit 72 comprises an elongated cylinder 73 which forms a flow channel in the bore hole and is provided with guide ribs 74 at the upper end thereof and ribs 75 at the lower end thereof to facilitate travel along the bore hole. A magnet 76, having a pair of coils 77 and 78 associated therewith, is supported centrally in cylinder 73. Coils 77 and 78 may be suitably connected to surface unit 70 through channel 71. As best illustrated in the sectional view of FIGURE 9, the magnet 76 is a short slotted cylinder, the slotted portion forming an air gap 79 in which the coils 77 and 78 are mounted. The pole faces adjacent air gap 79 have opposed magnetic polarities so that flux lines thread the air gap substantially uniformly between the adjacent ends of coils 77 and 78. Coils 77 and 78 are oriented so that when energized all magnetic fields produced thereby are similarly oriented normal or perpendicular to the unidirectional flux lines in air gap 79. The interior of the cylinder 73 forms a flow path to direct fluids through gap 79. In practice the unit may be lowered to or adjacent a producing horizon and measurements as above described in connection with FIGURE 4 or FIGURE 7 obtained of the resonance properties of the fluids to determine the proportion of water and oil flowing in the well at the selected location. Measurements made at several different depths in the bore hole will indicate the general producing character of the formations.

The foregoing relates to measurements of the properties of fluids flowing in the bore hole. It may be desirable to obtain measurements of the properties of fluids in the formations themselves. One manner of obtaining such measurements would be to force the exploring unit against the wall of the bore hole by a bow spring device 85. In such case the magnet structure 76 would be oriented in the cylinder 73 so that the air gap 79 and coils 77 and 78 would be maintained immediately adjacent the side of the cylinder 73 opposite bow spring 85 and adjacent the earth formations. Measurements of the free decay signals or of pulse echo signals may then be substantially affected by the adjacent formations. Preferably in this case the cylinder 73 would be provided with closed ends to prevent flow of fluid therethrough so that variations in relaxation phenomena would be due principally to variations in the properties of the formations.

In another aspect the invention relates to a determination of the proportions of adsorbed and chemically bound protons in, for example, cereals and the like. Measurements as above described may be made on such media as may produce the curve as shown in FIGURE 4 or FIGURE 7 or to provide one with a measure of the slopes of the lines 41, 42, etc.

Further, molecules containing protons existing in different nuclear relaxing environments may be studied independently by the method here provided. For example, a first catalyst of one distinctive characteristic may be found to contact water molecules at a hydrogen atom whereas a second catalyst of a different distinctive characteristic may be bound to the water molecule at the oxygen atom. Such differences in chemical association between the atoms affect the relaxation times of the nuclei and thus make possible the determination of the catalyst's effectiveness by measuring the relative proportions of water molecules bound at a hydrogen atom to those bound at an oxygen atom.

It should be noted that FIGURES 2, 3, 5 and 6 illustrate an oscillator pulse envelope. It is to be understood that the frequency of the pulsed field should be selected in dependence upon (1) the strength of the polarizing or unidirectional magnetic field, and (2) the gyromagnetic ratio of the atom under study. More particularly, the frequency of oscillation in the pulsed envelope should correspond to the Larmor frequency of the element under study. The Larmor frequency ($\eta$) is defined as:

$$(\eta) = \frac{\mu H_0}{Ih}$$

where $\mu$ is the magnetic moment of the element under study;
$I$ is the spin;
$h$ is Planck's constant; and
$H_0$ is the magnitude of the polarizing magnetic field.

While the foregoing description has been principally concerned with nuclear magnetic resonance phenomena in which protons are the energized nuclei, other nuclei may be susceptible of similar treatment. For example, fluorine and sodium possess nuclear magnetic moments and thus are susceptible to nuclear magnetic resonance measurements of the type above set out.

The magnetic moments and spins for protons, sodium and fluorine are as follows:

| | $\mu$ (Nuclear Magnetrons) | I |
|---|---|---|
| Protons | 2.79 | ½ |
| Sodium 23 | 2.217 | 3⁄2 |
| Flourine 10 | 2.628 | ½ |

Other spins and moments may be found tabulated in Review of Modern Physics, vol. 22 (1950), pages 64–76.

For the purposes of the present description, the use of the term "time domain approaching zero" shall be taken to mean the time domain as shown in FIGURES 4 and 7 where the initial slopes (lines 41 and 67, respectively) can be ascertained; i.e. the slope of the curve as $t$ approaches zero.

In contrast, the term "time domain approaching infinity" shall be taken to mean the points in time where the final slopes (42 and 65, respectively) of the curves can be ascertained; i.e. the slope of the curve as $t$ approaches infinity.

Figure 10:
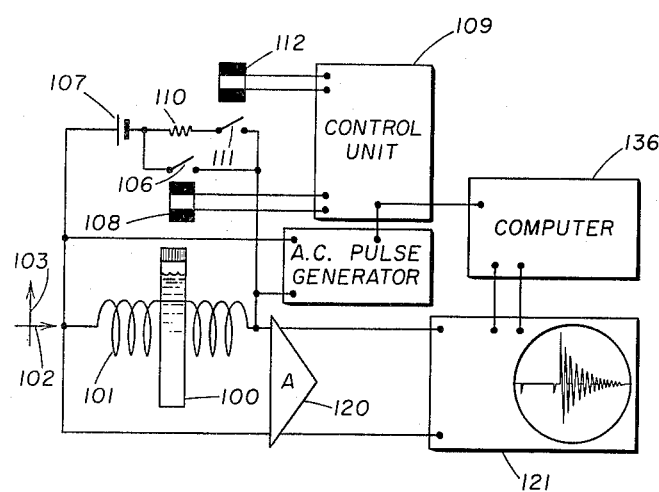
FIGURE 10 is a diagram of a low field resonance system.

In FIGURE 10 there is illustrated a system for carrying out the present invention where an environmental magnetic field is of relatively low magnitude as in the case of the earth's magnetic field. In accordance with this aspect of the invention, the longitudinal relaxation times or alternatively, the transverse relaxation times may be determined for a given mixture placed in a holder 100. The holder 100 may be taken as representative of various types of containers such as porous media in the case of earth formations or sample holders for discrete samples when a small quantity of a material is to be tested. Portions of the system illustrated are similar to systems known in the art for measurement of nuclear resonance signals in the earth's field. Representative of such prior art systems is that disclosed in an article entitled "Audio Frequency Nuclear Resonance Echoes" by Powles et al.—Nature, December 14, 1957, vol. 180, pages 1344 and 1345. Such systems may include a coil 101 which is provided for generating a unidirectional polarizing magnetic field directed along vector 102. The sample and the coil 101 are oriented such that the vector 102 is perpendicular with respect to the vector 103 which represents the earth's magnetic field. The coil 101 is connected by way of a first switch 106 to a battery 107. The opposite terminal of coil 101 is connected directly to battery 107. A relay coil 108 actuated under the control of a unit 109 serves periodically to close the switch 106. A second current path leads from the battery 107 to the coil 101 and includes a resistor 110 and a second switch 111. The switch 111 is controlled by relay 112 which is also energized under the control of unit 109.

Figure 11:
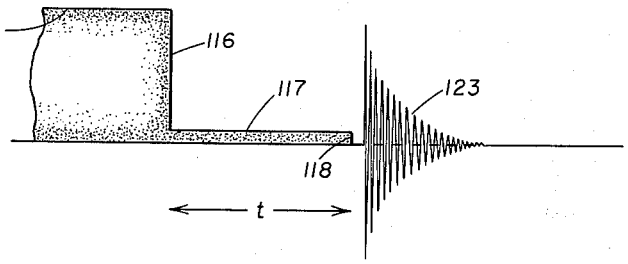
FIGURES 11–14 illustrate time-dependent functions involved in operation of the system of FIGURE 10.

In accordance with one mode of operating this system for measurement of relaxation time $T_1$, the relays 108 and 112 are simultaneously energized to establish a relatively high unidirectional magnetic field which establishes polarization of protons in the sample holder 100. The polarization is very high in comparison with that existing due to the earth's magnetic field. The high polarization is represented by the high level 115 of FIGURE 11. By way of example, level 115 is of the order of 100 times the earth's field. At time 116 corresponding with the abrupt reduction in polarization as shown in FIGURE 11, the relay coil 108 is de-energized. The current flowing thereafter through the coil 101 is of the relatively low value represented by the level 117. By way of example, level 117 is of the order of 10 times the earth's field. The current flow through the resistor 110 from battery 107 is thereafter terminated by de-energizing the relay 112 at time 118.

Application of the high level field 115 serves to establish a strong polarization in protons in the sample 100. The protons are brought into alignment with the vector 102 and are then held in such alignment. At time 116 when the level of the polarizing field is reduced to the level 117, there begins a decay in the magnitude of the polarization established by the high level field 115. The extent of the decay in polarization is determined by abruptly terminating the low level field 117 and then measuring the free precession signal 123 from nuclei still polarized at the instant of termination of the field 117 and which precess under the influence of the earth's magnetic field.

Figure 12:
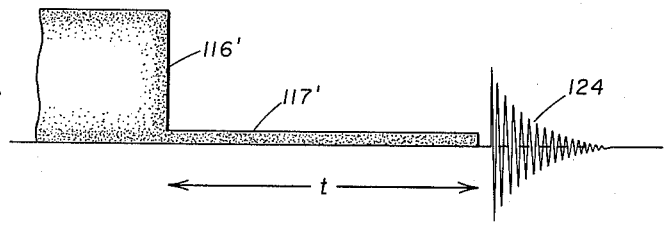

In FIGURE 12 it will be noted that the duration of the low level field 117' beginning at time 116' is much longer than the duration of the field 117 of FIGURE 11. It will also be noted that the initial amplitude of the free precession signal 124 is lower than the initial amplitude of the free precession signal 123 of FIGURE 11. This is for the reason that the decay in polarization is greater in FIGURE 12 due to the longer duration of the low level 117'. Measurement of the initial amplitude of such free decay signal provides data for evaluation of longitudinal relaxation time.

Measurements are made for at least four values of $t$, and of the type illustrated in FIGURES 11 and 12. There may then be plotted the values representative of the initial amplitudes of the free decay signal following removal of the low level field 117, 117'. The curve would be the curve described by Equation (5). From data for a single component sample the value of the longitudinal relaxation time is determined. Such data plotted on a logarithmic scale would fall along a straight line. However, for mixtures of two components, the exponential curve described by the data thus obtained would be the sum of two exponential functions. In order to evaluate or determine the longitudinal relaxation time in accordance with the present invention measurements are made of the initial values of the free decay signal in two different time domains. A minimum of four values are obtained in order to provide data sufficient to evaluate the relaxation time. In accordance with a graphical method illustrated in FIGURES 4 and 7 it will be desirable to conduct measurements with the value of $t$, FIGURES 11 and 12, very small. Preferably the value of $t$ will be as short as is possible to operate without encountering interference by reason of transient phenomena that may be present due to the abrupt step at time 116. Additional data will then be obtained with the time interval $t$ relatively long so that the data necessary for providing a reliable graphical interpretation of two different slopes in a curve will be present. It will be appreciated however, that if techniques other than graphical techniques are to be employed that the data can be more closely disposed in the domain of the time interval $t$. Known computational techniques may then be employed for determining the contribution to the sum of two exponential decay functions of two relaxation phenomena. As shown in FIGURE 10 computer 136 is connected to unit 121 to receive signals representative of initial amplitudes (FIGURES 11 and 12) or peak amplitudes (FIGURES 13 and 14).

Computer 136 is programmed to compute the four unknown parameters of Equation 5. More particularly in addition to evaluating the two exponential functions, there also is determined the relative proportions of the two constituents in the mixture which give rise to the exponential function. The computer produced a physical representation of the decay portions of the exponential functions as well as physical representations of the coefficients of the exponential functions.

With reference to FIGURE 7, for example, the first decay function of the exponential curve 67 is represented by the straight line 66 which extrapolated to zero time $t$ has an intercept $Y_3$. The interval on the graph of FIGURE 7 from $Y=0$ to $Y_3$ is representative of the population of nuclei having the decay function represented by the line 66. The interval from $Y_3$ to $Y_2$ is representative of the population of nuclei having the decay function represented by the straight line 65. Physical representations of such parameters may be in the form of the graphs or may be a voltage or like condition stored or set in Computer 136.

Figure 13:
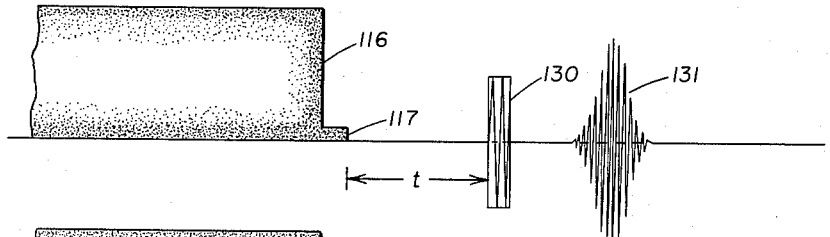
Figure 14:
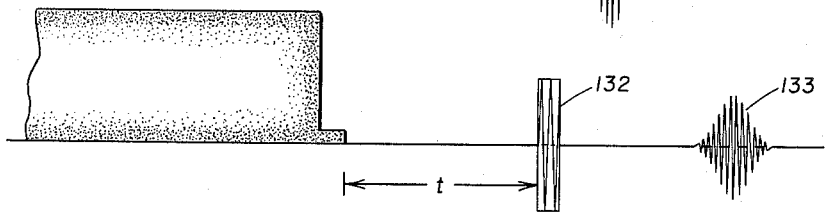

Referring now to FIGURES 13 and 14, there is illustrated a system for performing measurements in low fields such as the earth's magnetic field through a pulse echo technique which is similar to that illustrated in FIGURES 5 and 6. In this instance in each measurement it will be desirable to maintain the time interval 116–117 as short as possible while avoiding undesirable transients due to the abrupt cessation of the high level field. However, following the time 117 by a time interval $t$, there is applied from pulse generator 129 an alternating current pulse 130 the frequency of which corresponds with the Lamor frequency of the protons in the earth's magnetic field. Following application of the pulse 130 by a similar time interval $t$, there will be observed a peak in an echo signal 131. In FIGURE 14 the effect of variations in the time interval $t$ is illustrated. In FIGURE 14 the time interval $t$ is longer than that of FIGURE 13. As a consequence, the pulse echo signal 133 following the reversing pulse 132 is smaller in amplitude. The effect of the reversing pulses 130, 132 is to reverse the phase angle of the precessing nuclei as accumulated during the time $t$ elapsing after time 117.

In accordance with the present invention, measurements are made under the control of unit 109 with values of $t$ preferably approaching the zero time domain and in a time domain approaching infinity such that the constituents of the mixture may be identified. For graphical procedures as wide separation as possible in the domains of measurement will be preferable in order to clearly delineate the two sets of data. For computational techniques the data may be more closely bunched but must be sufficiently spread and be of sufficient accuracy to permit the delineation of the two exponential functions representative of the decay of the maximum amplitude of the pulse echo signal as a function of the time interval $t$.

It will be noted from an inspection of Equations (5) and (10) that they are similar in that data on graphs shown in FIGURES 4 and 7 may be plotted other than in the specific manner there shown. For example, the graph of FIGURE 4 could be treated such that the function R, which is the curve 40, would be of the same general character as the function M, the curve 67 of FIGURE 7. Characteristics of the curve itself and the manner in which the data is observed to vary will depend upon the choice of parameters plotted. In FIGURE 4 a particular function R was plotted. A different function M is plotted in FIGURE 10. The function R is dependent upon free decay signals and the function M is dependent upon spin echo signals. In both cases the functions are time-dependent. They are not necessarily the same functions since they are based upon different phenomena, but they fall into the same general family when expressed mathematically.

Having described the invention in connection with certain specific embodiments thereof, it is to be understood that further modifications may now suggest themselves to those skilled in the art and it is intended to cover such modifications as fall within the scope of the appended claims.

What is claimed is:

1. In the analysis of two component mixtures, the steps of:
    (a) establishing a polarizing magnetic field in said mixture whereby nuclei of each of the components therein at equilibrium attain a predominant orientation,
    (b) repeatedly applying pairs of similarly oriented radio-frequency electromagnetic field pulses to said mixture to produce gyromagnetic precession spin echo signals in the nuclei of each said component,
    (c) detecting the spin echo electromagnetic signals from the components following removal of said field pulses in at least two different time domains where one of said domains is such that said signals are predominantly controlled by one of said two components and the other of said domains is such that said signals are predominantly controlled by the other of said two components, and
    (d) recording functions representative of the logarithm of the magnitudes of said signals.

2. In the analysis of two component mixtures, the steps of:
    (a) establishing a polarizing magnetic field in said mixture whereby nuclei of each of the components therein at equilibrium attain a predominant orientation,
    (b) repeatedly applying pairs of similarly oriented electromagnetic field pulses to said mixture to produce gyromagnetic precession spin echo signals in the nuclei of each said component,
    (c) detecting the spin echo electromagnetic signals from the components following removal of said field pulses in at least two different time domains where one of said domains is such that said signals are predominantly controlled by one of said two components and the other of said domains is such that said signals are predominantly controlled by the other of said two components, and
    (d) recording functions representaive of the logarithm of the magnitudes of said signals.

3. In the determination of the relative proportions of two components of a mixture, the steps of:
    (a) polarizing the atoms of said mixture whereby certain nuclei of said two components attain a predominant orientation at equilibrium,
    (b) applying at least two pairs of pulsed, time-spaced, radio-frequency electromagnetic fields to said mixtures where the intervals between said pulsed fields of said two pairs are different but both in the same time domain approaching zero,
    (c) similarly applying at least two pairs of pulsed, time-spaced, radia-frequency electromagnetic fields where the intervals between said pulsed fields of said last-named pairs of pulses are different but both in the time domain approaching infinity,
    (d) separately measuring the amplitude of induced magnetic fields produced by precession of said nuclei after removal of each pair of said electromagnetic fields,
    (e) charting representations of a curve of the log of said precession signal amplitudes as a function of said time domains,
    (f) constructing tangent lines to said curve in the respective regions of infinite and zero time domains, and
    (g) indicating by extrapolation the zero intercepts of said tangent lines to provide data indicative of the relative proportions of the components of said mixture.

4. In the determination of the relative proportions of two components of a mixture, the steps of:
    (a) polarizing the atoms of said mixture whereby certain nuclei of said two components attain a predominant orientation at equilibrium,
    (b) applying at least two pairs of pulsed, time-spaced electromagnetic fields to said mixtures where the intervals between said pulsed fields of said two pairs are different but both in the same time domain approaching zero,
    (c) similarly applying at least two pairs of pulsed, time-spaced, electromagnetic fields where the intervals between said pulsed fields of said last-named pairs of pulses are different but both in the time domain approaching infinity,
    (d) separately measuring the amplitude of induced magnetic fields produced by precession of said nuclei after removal of each pair of said electromagnetic fields,
    (e) charting representations of a curve of the log of said precession signal amplitudes as a function of. said time domains,
    (f) constructing tangent lines to said curve in the respective regions of infinite and zero time domains, and
    (g) indicating by extrapolation the zero intercepts of said tangent lines to provide data indicative of the relative proportions of the components of said mixture.

5. The method of determining relative proportions of two components of a mixture, the nuclei of which are polarized in a magnetic field, which comprises:
    (a) modifying the magnetic field effective in the region occupied by said nuclei in accordance with each of at least four different time-dependent control functions, two of said functions being in the time domain approaching zero with reference to the polarization of said nuclei and two of said functions being in the time domain approaching infinity,
    (b) measuring signals due to precession of said nuclei following modification of the magnetic field in accordance with each of said four functions, and
    (c) establishing a physical function representative of $T_{xi}$, the longitudinal relaxation time $T_1$ of the $i$th component or the transverse relaxation time $T_2$ of the $i$th component, where such relaxation time has the following relationship to signal amplitude and spacing in said time domain $$M = \Sigma M_{0i} e^{-t/T_{xi}}$$

where

M is the function descriptive of variations in the amplitude of said signals as a function of spacing in said time domain, and $M_{0i}$ is the contribution to the amplitude of the signal due to precession in the region of one extremity of said time domain of nuclei of the $i$th component.

6. The method of determining relative proportions of two components of a mixture, the nuclei of which are polarized in a magnetic field, which comprises:
    (a) modifying the magnetic field effective in the region occupied by said nuclei in accordance with each of at least four different time-dependent control functions, two of said functions being in the time domain approaching zero with reference to the polarization of said nuclei and two of said functions being in the time domain approaching infinity,
    (b) measuring signals due to precession of said nuclei following modification of the magnetic field in accordance with each of said four functions, and
    (c) establishing a physical function representative of the longitudinal relaxation time $T_{1i}$ of the $i$th component, where such relaxation time has the following relationship to signal amplitude and spacing in said time domain $$M = \Sigma M_{0i} e^{-t/T_{1i}}$$

where

M is the function descriptive of variations in the amplitude of said signals as a function of spacing in said time domain, and $M_{0i}$ is the contribution to the amplitude of the signal due to precession in the region of one extremity of said time domain of nuclei of the $i$th component.

7. The method of determining relative proportions of two components of a mixture, the nuclei of which are polarized in a magnetic field, which comprises:
  (a) modifying the magnetic field effective in the region occupied by said nuclei in accordance with each of at least four different time-dependent control functions, two of said functions being in the time domain approaching zero with reference to the polarization of said nuclei and two of said functions being in the time domain approaching infinity,
  (b) measuring signals due to precession of said nuclei following modification of the magnetic field in accordance with each of said four functions, and
  (c) establishing a physical function representative of the transverse relaxation time $T_{2i}$ of the $i$th component where such relaxation time has the following relationship to signal amplitude and spacing in said time domain $$M = \Sigma M_{0i} e^{-t/T_{2i}}$$

where

M is the function descriptive of variations in the amplitude of said signals as a function of spacing in said time domain, and $M_{0i}$ is the contribution to the amplitude of the signal due to precession in the region of one extremity of said time domain of nuclei of the $i$th component.

8. In the analysis of two component mixtures the steps of:
  (a) establishing a polarizing magnetic field in said mixture whereby nuclei of each of the components therein at equilibrium attain a predominant orientation,
  (b) repeatedly applying pairs of similarly oriented radio-frequency electromagnetic fields to said mixture to produce gyromagnetic free decay precession signals in the nuclei of each said component,
  (c) detecting the free decay electromagnetic signals from the components following removal of such fields in at least two different time domains where one of said domains is such that said signals are predominantly controlled by one of said two components and the other of said domains is such that said signals are predominantly controlled by said two components, and
  (d) recording functions representative of the logarithms of said signals.

9. In the determination of the relative proportions of two components of a mixture, the steps of:
  (a) polarizing the atoms of said mixture whereby nuclei possessing magnetic moments attain at equilibrium a predominant orientation,
  (b) applying a plurality of pairs of radio-frequency induced magnetic fields each similarly oriented in space relative to said predominant orientation of said atoms,
  (c) measuring the amplitude of induced magnetic fields after removal of each of a plurality of pairs of such radio-frequency fields in each of two different time domains where one of said domains is such that said induced magnetic fields are predominantly controlled by one of said two components and the other of said domains is such that said induced magnetic fields are predominantly controlled by said two components, and
  (d) charting the logarithms of the measurements of said induced magnetic fields as functions of said domains to determine variations in the growth rates thereof in each of said domains whereby said growth rates may be correlated in terms of the relative proportions of components of said mixture as said components control said induced magnetic fields in different domains.

10. In the determination of the relative proportions of two components of a mixture, the steps of:
  (a) polarizing the atoms of said mixture whereby certain nuclei of said two components attain a predominant orientation at equilibrium,
  (b) applying at least two pairs of pulsed, time-spaced, radio-frequency electromagnetic fields to said mixtures where the intervals between said pulsed fields of said two pairs are different but both in the same time domain approaching zero,
  (c) similarly applying at least two pairs of pulsed, time-spaced, radio-frequency electromagnetic fields where the intervals between said pulsed fields of said last-named pairs of pulses are different but both in the time domain approaching infinity,
  (d) separately measuring the amplitude of induced magnetic fields produced by precession of said nuclei after removal of each pair of said electromagnetic fields, and
  (e) charting functions representative of the logarithm of the measurements of said induced electromagnetic fields in correlation with the lengths of said intervals to determine variations in the growth rates thereof in each of said domains whereby said growth rates may be correlated in terms of the relative proportions of components of said mixture as said components control said induced magnetic field in different time domains.

11. In the determination of the relative proportions of two components of a mixture, the steps of:
  (a) establishing a polarizing magnetic field in said mixture whereby certain nuclei of said two components attain a predominant orientation at equilibrium in said field,
  (b) applying a first pair of pulsed magnetic fields to said mixture normal to said polarizing field where the time interval between the pulsed fields is in the time domain approaching zero,
  (c) in response to a first induced magnetic field due to precession of nuclei in said polarizing magnetic field following removal of the second pulse of said pair of pulsed fields deriving a function representative of the logarithm of the amplitude of said first induced magnetic field,
  (d) similarly applying a second pair of pulsed magnetic fields to said mixture where the time interval between the pulsed fields is in the time domain approaching zero but differs from the interval between pulsed fields of said first pair,
  (e) in response to a second induced magnetic field due to precession of nuclei in said polarizing magnetic field following removal of the second pulse of said second pair of pulsed fields deriving a function representative of the logarithm of the amplitude of said second induced magnetic field,
  (f) similarly applying a third pair of pulsed magnetic fields to said mixture where the time interval between said pulsed fields is in the time domain approaching infinity,
  (g) in response to a third induced magnetic field due to precession of nuclei in said polarizing magnetic field following the removal of the second pulse of said third pair of pulsed fields deriving a function representative of the logarithm of the amplitude of said third induced magnetic field, (h) similarly applying a fourth pair of pulsed magnetic fields where the time interval between the pulsed fields is in the time domain approaching infinity but differs from the interval between the pulsed fields of said third pair, (i) in response to a fourth induced magnetic field to precession of nuclei in said polarizing magnetic field following removal of the second pulse of the pulsed fields of said fourth pair deriving a function representative of the logarithm of the amplitude of said fourth induced magnetic field, and (j) charting functions representative of the induced magnetic fields to determine variations in the growth rates of said induced magnetic fields in the time domain approaching zero and in the time domain approaching infinity whereby said growth rates may be correlated in terms of the relative proportions of components of said mixture as said components control said induced magnetic fields.

12. In the determination of the relative proportions of two components of a mixture, the steps of:

(a) establishing a polarizing magnetic field, (b) repeatedly applying a plurality of pairs of radio-frequency electromagnetic fields having direction normal to said polarizing magnetic field, (c) in response to a first free decay electromagnetic signal in the time interval immediately following termination of the first field of one of said pairs of fields generating a first function representative of the logarithm of the amplitude of said first signal, (d) generating a second function representative of the logarithm of the amplitude of a second free decay signal which appears following termination of the second field of a pair of said fields where the interval between said pair of fields is in the time domain approaching zero, (e) in response to a third free decay electromagnetic signal following terminating of the second field of a second pair of fields where the time interval between the fields of said second pair of fields is in the time domain approaching zero generating a third function representative of the logarithm of the amplitude of said third signal, (f) generating a fourth function representative of the logarithm of the amplitude of a fourth free decay signal following termination of the second field of a third pair of fields where the time interval between the fields of said third pair of fields is in the time domain approaching infinity, (g) in response to a fifth free decay electromagnetic signal following termination of the second field of a fourth pair of fields where the interval between the fields of said fourth pair of fields is in the time domain approaching infinity and different from the time interval between the fields of said third pair of fields generating a fifth function representative of the logarithm of the amplitudes of said fifth signal, and (h) recording said first–fifth functions to determine variations in the growth rates of said free decay electromagnetic signals as a function of said time intervals whereby said growth rates may be correlated in terms of the relative proportions of components of said mixture as said components control said free decay signals.

13. In the determination of the relative proportions of two components of a mixture, the steps of:

(a) polarizing the atoms of said mixture whereby nuclei possessing magnetic moments attain at equilibrium a predominant orientation, (b) applying to said mixture a plurality of pairs of pulsed radio-frequency electromagnetic fields each similarly oriented in space relative to said predominant orientation of said atoms, (c) generating functions representative of the logarithm of the amplitudes of electromagnetic pulse echo signals due to precession of said nuclei after the removal of each of a plurality of pairs of such radio-frequency fields in each of two different time domains, wherein one of said time domains said electromagnetic pulse echo signals are predominantly controlled by one of said two components and where in the other of said time domains the electromagnetic signals are predominantly controlled by the other of said components, and (d) charting said functions in terms of the length of the time intervals between pulses of said pairs of fields whereby the growth rates of said pulse echo signals may be correlated in terms of the relative proportions of components of said mixture as said components control said pulse echo signals.

14. In the analysis of a two component mixture wherein nuclei thereof are polarized and at equilibrium attain a predominant orientation, the steps of:

(a) repeatedly applying pairs of similarly oriented electromagnetic field pulses to said mixture to produce gyromagnetic precession spin echo signals in the nuclei of each said component, (b) detecting the electromagnetic precession signals from the components following removal of said field pulses in at least two different time domains where one of said domains is such that said signals are predominantly controlled by one of said two components and the other of said domains is such that said signals are predominantly controlled by the other of said two components, and (c) recording functions representative of the logarithm of said signals.

15. In the analysis of two component mixtures, the steps of:

(a) establishing a polarizing magnetic field in said mixture whereby nuclei of each of the components therein at equilibrium attain a predominant orientation, (b) repeatedly applying pairs of similarly oriented radio-frequency electromagnetic field pulses to said mixture to produce gyromagnetic precession spin echo signals in the nuclei of each said component, (c) detecting the electromagnetic precession signals from the components following removal of said field pulses in at least two different time domains where one of said domains is such that said signals are predominantly controlled by one of said two components and the other of said domains is such that said signals are predominantly controlled by the other of said two components, and (d) recording functions representative of the logarithm of said signals.

16. In the determination of the relative proportions of two components of a mixture, the steps of:

(a) polarizing the atoms of said mixture whereby certain nuclei of said two components attain a predominant orientation at equilibrium, (b) applying at least two pairs of pulsed, time-spaced, radio-frequency electromagnetic fields to said mixtures where the intervals between said pulsed fields of said two pairs are different but both in the same time domain approaching zero, (c) similarly applying at least two pairs of pulsed, time-spaced, radio-frequency electromagnetic fields where the intervals between said pulsed fields of said last-named pairs of pulses are different but both in the time domain approaching infinity, (d) separately measuring the amplitude of induced magnetic fields produced by precession of said nuclei after removal of each pair of said electromagnetic fields, and (e) charting representations of a curve of the logarithm of said precession signal amplitudes as a function of said time domains to indicate by the extrapolation of the zero intercepts of tangents to said curve in the regions of infinite and zero time domains the relative proportions of the components of said mixture.

References Cited by the Examiner

Brown et al.: Journal of Petroleum Technology, vol. 219, August 1960, pp. 201 to 209.

Hahn et al.: Physical Review, vol. 88, No. 5, Dec. 1, 1952, pp. 1070 to 1084.

Hahn: Physical Review, vol. 80, No. 4, Nov. 15, 1950, pp. 580 to 594.

Pollard and Davidson: Applied Nuclear Physics, John Wiley & Sons, Inc., New York, copyright 1942 (fourth printing August 1945), pp. 132 to 135.

Powles et al.: Archives des Sciences (ampere edition), vol. 11, July 1958, pp. 209 to 214.

Zimmerman et al.: Journal of Physical Chemistry, vol. 60, No. 8, September 1956, pp. 1157 to 1161, and vol. 61, No. 10, October 1957, pp. 1328 to 1333.

LEWIS H. MYERS, *Primary Examiner.*

CHESTER L. JUSTUS, MAYNARD R. WILBUR, *Examiners.*